United States Patent [19]

Shiohara

[11] 4,364,346
[45] Dec. 21, 1982

[54] EXHAUST TIMING CONTROL DEVICE FOR A TWO-CYCLE ENGINE

[75] Inventor: Masakazu Shiohara, Iwata, Japan

[73] Assignee: Yamaha Hatsudoki Kabushiki Kaisha, Iwata, Japan

[21] Appl. No.: 219,328

[22] Filed: Dec. 22, 1980

[30] Foreign Application Priority Data

Dec. 27, 1979 [JP] Japan ............................... 54-170869

[51] Int. Cl.³ ..................... F02B 75/02; F02B 25/06
[52] U.S. Cl. ............................. 123/323; 123/65 PE; 123/73 SP
[58] Field of Search ............... 123/323, 65 PE, 65 P, 123/73 SP, 73 R, 73 A

[56] References Cited

U.S. PATENT DOCUMENTS 4,121,552 10/1978 Mithuo .............................. 123/323

FOREIGN PATENT DOCUMENTS 54-9220 1/1979 Japan .

Primary Examiner—Wendell E. Burns
Attorney, Agent, or Firm—Donald D. Mon

[57] ABSTRACT

An exhaust timing control device for a two-cycle internal combustion engine, in which a valve member functioning as the upper edge of an exhaust port that opens into the inner circumference of a cylinder is disposed in the upper wall of an exhaust passage from said exhaust port. A valve hole having an elongated cross-section is opened in the wall of the exhaust passage in the vicinity of the exhaust port, and is formed at an inclination with respect to the axis of said cylinder. The valve member is arranged slidably in said valve hole so that it can be retracted into said valve hole until the leading end portion thereof becomes substantially coextensive with the inner wall surface of said exhaust passage.

3 Claims, 4 Drawing Figures

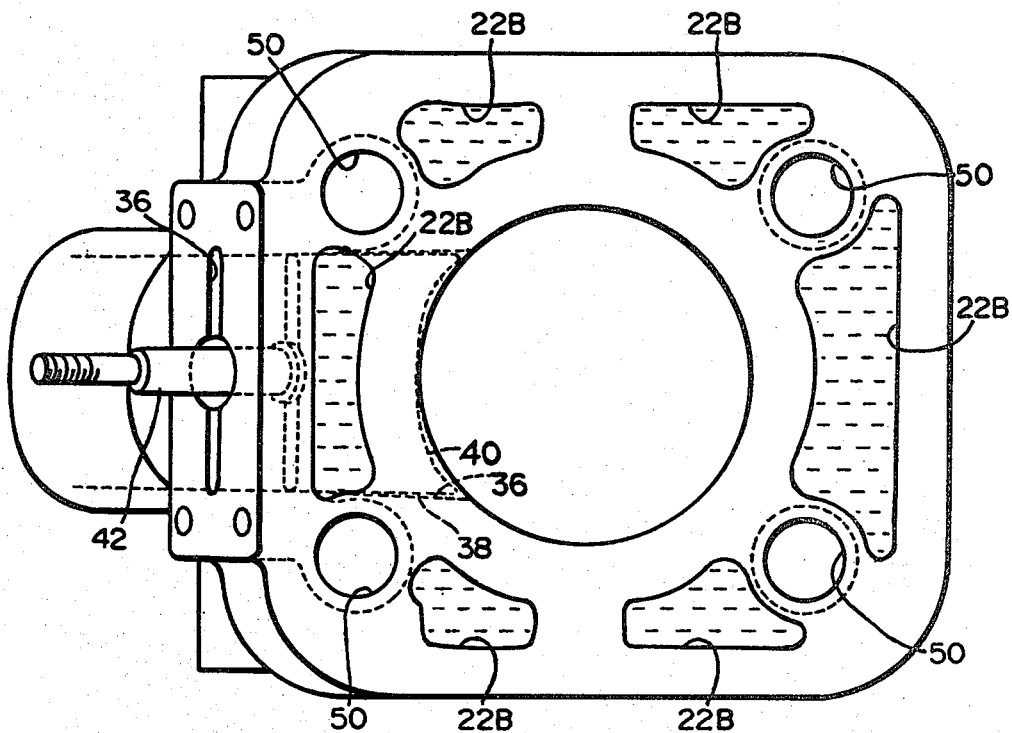
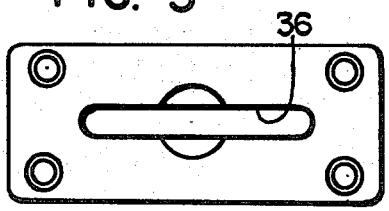
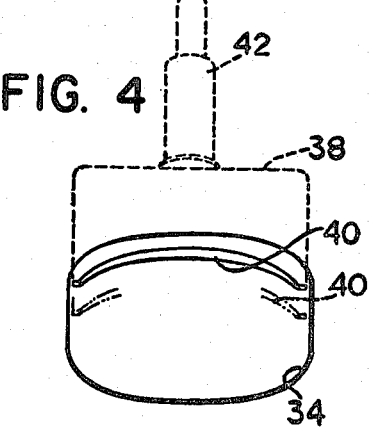

EXHAUST TIMING CONTROL DEVICE FOR A TWO-CYCLE ENGINE

Field of the Invention

The present invention relates to an exhaust timing control device for a two-cycle internal combustion engine, and more particularly to an exhaust timing control device of the above type, in which a valve member functioning as the upper edge of an exhaust port which opens onto the inner circumference of a cylinder is disposed in the upper wall of an exhaust passage in the vicinity of said exhaust port.

BACKGROUND OF THE INVENTION

In one exhaust timing control device according to the prior art, a rotary type valve member is disposed in the edge portion of an exhaust passage at the side of a cylinder head which opens into the inner circumferences of a cylinder. The aforementioned valve member is formed into a drum shape with its circumference extending along the inner circumference of the cylinder and is axially divided into two halves. This valve member is rotatably disposed in the recess, which recess is formed in the edge portion of the exhaust passage at the side of the cylinder head, so that its axial direction of rotation intersects the axial direction of the cylinder at a right angle. By turning the aforementioned valve member, therefore, the edge portion of the circumference thereof which faces the inner circumference of the cylinder is shifted in the axial direction of the cylinder so that the height of the opening of the exhaust passage is varied to change the exhaust timing.

However, since the aforementioned conventional exhaust timing control device for a two-cycle engine has its valve member formed into a drum shape, the valve member has its diameter made remarkably larger at its ends than at its intermediate portion so that the valve member itself tends to be larger than optimal. As a result, the recess to receive the aforementioned valve member is accordingly enlarged so that the thickness of the cylinder body is accordingly reduced, and this involves a reduction in strength. Especially the portion of the cylinder body which is sandwiched between the valve member and the inner circumference of the cylinder is thinned, because the valve member is of the rotary type, thereby further to invite a disadvantage in strength. There results the risk that the cylinder may be thermally deformed. In the aforementioned conventional exhaust timing control device for the two-cycle engine, moreover, the valve member is so arranged that its axis of rotation intersects the axial direction of the cylinder. The valve member, which has its drum shape divided at its center portion into the right and left halves, is inserted, when it is to be assembled in the receiving portion of the cylinder body from the side of the cylinder in the direction to intersect the axial direction of the cylinder. In the case of a multi-cylinder engine, therefore, the respective cylinders have to be made so separate that the adjoining cylinders may not constitute obstacles upon insertion and assembly of the valve member, frustrating the design of an integrated multi-cylinder body.

It is therefore an object of the present invention to provide such an exhaust timing control device for a two-cycle engine which has no thinned portion in a cylinder body, which is free from deformation from thermal stress, which can be assembled without difficulty, and which can adopt a multi-cylinder body.

BRIEF DESCRIPTION OF THE INVENTION

An exhaust timing control according to this invention is used with a two-cycle engine having a cylinder, a piston slidably fitted in the cylinder, and an exhaust port in the cylinder wall at an upper portion (sometimes called an "upper wall"). The objective is to vary the effective location of the upper edge of this port, and for this purpose, the wall of an exhaust passage leading from the exhaust port is formed with a valve hole in which a valve member is slidably fitted. It can be withdrawn to form part of that wall, or adjustably extended to form the effective exhaust valving edge of the exhaust port.

Preferably the valve hole is directed obliquely relative to the cylinder axis.

The above and other features of this invention will be fully understood from the following detailed description and the accompanying drawings, in which:

BRIEF DESCRIPTION OF THE DRAWINGS

FIG. 2 is a top plan view showing the cylinder of FIG. 1 with the cylinder head removed.

FIG. 3 is a top plan view showing the shape of a valve hole, which is formed in the cylinder of FIG. 1 and into which a valve member is inserted, with the cover of the valve hole being removed; and FIG. 4 is a view taken in the direction of arrow A in FIG. 1.

DETAILED DESCRIPTION OF THE INVENTION

Figure 1:
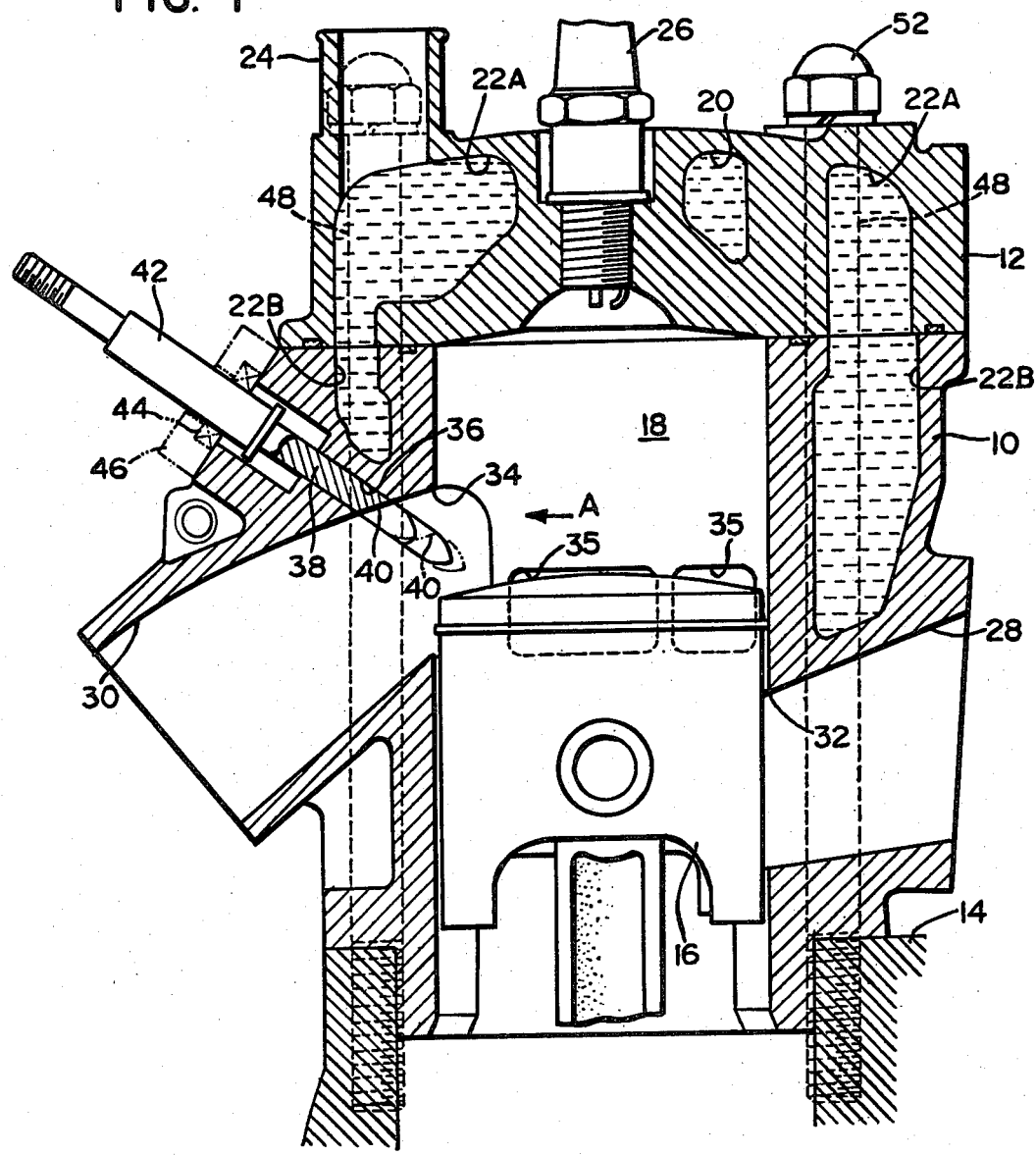
FIG. 1 is a sectional view showing the internal construction of the cylinder, to which an embodiment according to the present invention is applied.

FIG. 1 is a sectional view showing the internal construction of a cylinder. Indicated by reference numeral 10 in FIG. 1 is a cylinder body, to the upper and lower portions of which a cylinder head 12 and a crankcase 14 are attached, respectively. In cylinder body 10 there is slidably arranged a piston 16 so that a combustion chamber 18 is defined by a portion of the bottom surface of the cylinder head 12, the inner circumference of the cylinder body 10 and the head (top) surface of the piston 16. Numerals 20, 22A and 22B indicate cooling water jackets which are formed in the cylinder body 10 and in the cylinder head 12. Cooling water jackets 22A and 22B communicate to form a common cooling water jacket. Cooling water jackets 20, 22A and 22B communicate with a water pump and a radiator (not shown) through a connecting tube 24, whereby the cooling water is circulated. Cooling water jackets 20, 22A and 22B are shown only partially in FIG. 1, but the cooling water jacket 22B is formed all over the circumference, as shown in FIG. 2. FIG. 2 is a top plan view showing the head surface of the cylinder with the cylinder head 12 removed from the head surface of the cylinder body 10.

As shown in FIG. 1, an ignition plug 26 is mounted in the center portion of the cylinder head 12, and an intake passage 28 and an exhaust passage 30 are formed in the side of the cylinder body 10. The intake passage 28 in turn is formed with an intake port 32, through which an air-fuel mixture is introduced into the combustion chamber 18. Exhaust passage 30 is formed with an exhaust port 34, which opens into combustion chamber 18. Cylinder body 10 has its side wall formed, as shown in FIG. 1, with scavenging ports 35 and 35, which communicate with the inside of the crankcase 14 through scavenging passages (not shown).

In cylinder body 10, as shown in FIG. 1, a valve hole 36, in which a later-described valve member is slidably arranged, is formed in the vicinity of the exhaust port 34 and at an inclination of 55 degrees with respect to the axis of the cylinder. While it is formed in metal that is integral with the cylinder, it is actually located in the wall of the exhaust passage, assuming the term exhaust port to mean the actual intersection of the exhaust passage and the cylinder wall. Valve hole 36 has its cross-section formed into an elongated oval shape, as shown in FIGS. 2 and 3. FIG. 3 is a top plan view showing an upper view of the valve hole 36 which is formed in the cylinder body (or more properly stated, in the exhaust passage wall), with a valve body and its cover (described below) being removed. A plate-shaped valve member 38 is slidably fitted in elongated oval valve hole 36, as shown in FIGS. 1 and 2. The cross-section of valve member 38 is formed, although not shown, into an elongated oval shape which corresponds to the shape of valve hole 36 in order to receive the valve member 38. FIG. 4 is a perspective view showing the inner circumference, as viewed in the direction of arrow A in FIG. 1, thus showing the shape of the tip 40 of the valve member 38.

More specifically, valve tip 40 is formed into a slightly curved recess shape in a manner to become substantially coincident with both the arcuate shape of the inner circumference of the cylinder body 10 and the upper edge portion of the exhaust passage 30. As a result, tip 40 of valve member 38 when located as indicated in solid lines in FIGS. 1 and 4 at its most retracted position in the valve hole 36, forms a part of the upper edge of the exhaust passage 30. At the most protruded position, as shown in double-dotted lines, the tip 40 of valve member 38 forms a part of the circular shape of the cylinder. Thus, the valve member 38 can be slid in the hole to change its position in the valve hole 36, thereby to substantially change the position of the upper edge of the exhaust port 34 so that the exhaust timing can be varied.

The trailing end portion of the valve member 38 is formed into a valve stem 42, the end portion of which is connected through a link mechanism or the like to an actuator or the like (not shown) which is operated in accordance with the speed and output of the engine. In accordance with the speed and output of the engine, valve member 38 slides so that it is located at its most retracted position in the valve hole 36 during a high speed running operation, as shown in solid lines in FIGS. 1 and 4, thereby to advance the opening timing of the exhaust port 34. It is protruded the more from the valve hole 36 into the exhaust passage 30, as the running operation is shifted from high speed to low speed, thereby substantially to retard the opening timing of the exhaust port 34. A seal 44 and a cover 46 are mounted on the outer side of the valve hole 36 thereby to maintain a hermetical seal.

Cylinder body 10, cylinder head 12, and crankcase 14 are connected, as shown in FIG. 1, by means of stub bolts 48 which are anchored in crankcase 14. Since the prior art utilizing a drumshape valve member has its valve member transversely extending through the cylinder body, the cylinder head, the cylinder body and the crankcase cannnot be connected by means of through bolts. Instead, the cylinder head and the cylinder body, and the cylinder body and the crankcase are connected by means of separate bolts. In contrast, in the present embodiment the through holes 50 for the stud bolts 48 can be formed in a manner to miss the valve member, as shown in FIG. 2, without taking up much transverse space, so that the through bolts can be used firmly to connect those three parts, i.e., the cylinder body 10, the cylinder head 12 and the crankcase 14. A cap nut 52 is fastened to the head of each of the stud bolts 48, as shown in FIG. 1.

The operations of the embodiment having the construction thus far described will now be described. First of all, since the stem 42 of the valve member 38 is connected through a link mechanism to an actuator which is operable in accordance with the speed and output of the engine, valve member 38 is shifted in the valve hole 36 in accordance with the engine speed and output from the position of the solid lines to the position of the double-dotted lines, as shown in FIG. 1. During high speed running operation, valve member 38 is at its most retracted position in the valve hole 36, as shown in the solid lines, thereby to advance the opening timing of the exhaust port 34. At this time, the tip 40 of the valve member 38 is shaped substantially to coextend with the upper edge of the exhaust passage 30 thereby to form a part of the upper edge of the exhaust passage 30. As the engine is shifted to its low speed running operation, tip 40 of valve member 38, is gradually protruded into exhaust passage 30. When valve member 38 arrives at the position shown in the double-dotted lines in the exhaust passage 30, the position of the upper edge of the exhaust port 34 is materially lowered, and the exhaust timing is retarded.

As has been described, according to the embodiment of the exhaust timing control device of the present invention for a two-cycle engine, valve member 38 is formed into a plate shape so that its size can be made smaller than the drum-shaped valve body according to the prior art. As a result, the receiving portion of valve member 38, which is formed in the cylinder body 10, can be made small so as to invite an advantage in the strength of the cylinder. In the embodiment according to the present invention, moreover, since the valve member 38 performs not a rotary motion but instead an inclined linear motion, the portion of the cylinder body 10, which is sandwiched between the valve member 38 and the inner circumference of the cylinder, need not be made excessively thin. As a result, there is no fear that the cylinder body 10 will be deformed. In the embodiment according to the present invention, because the valve member 38 is neither inserted nor assembled transversely of the cylinder body 10 but is merely inserted downward, the assembly can be facilitated. Especially in the case of a multi-cylinder engine, because the assembly can be effected without any obstruction by adjoining cylinders, an integrated multi-cylinder body can be constructed. In the embodiment according to the present invention, because plate-shaped valve member 38 can slide at an inclination with respect to the axis of the cylinder, the construction can be simplified so that the engine can be made compact.

As has been described according to the exhaust timing control device of the present invention because the valve member which functions as the upper edge of the exhaust port is arranged slidably in the valve hole, which valve hole is formed at an inclination with respect to the axis of the cylinder, the aforementioned valve member can be retracted into the valve hole during high speed running operation until it becomes substantially coextensive with the inner wall surface of the exhaust passage, and the thickness of the cylinder in the vicinity of the valve member can be prevented from becoming excessively thin. Moreover, because the valve member can be inserted downward, it is possible to construct an integrated multi-cylinder body.

This invention is not to be limited to the embodiment shown in the drawings and described in the description, which is given by way of example and not of limitation, but only in accordance with the scope of the appended claims.

I claim:

1. In an internal combustion engine having a cylinder with a cylindrical inner wall, a cylinder axis, a cylinder head, and a piston slidably fitted in said cylinder, thereby to form a combustion chamber, said inner wall having an exhaust port opening into said chamber, an exhaust passage departing laterally from said exhaust port, said passage having a passage wall, exhaust timing means comprising: said wall of said exhaust port having a valve hole formed at an oblique angle to said cylinder axis and opening into said exhaust passage adjacent to said exhaust port, a valve member slidably fitted in said valve hole for movement therein at said angle so as to be withdrawable toward the wall of said exhaust passage, and to be extendible to approach said exhaust port at an elevation lower than the upper edge of said exhaust port.

2. Apparatus according to claim 1 in which said valve member is plate like, its edge facing said exhaust passage being curved, on one side shaped generally to conform to the contour of said exhaust passage when retracted thereto, and on the other side shaped generally to conform to the center of said cylinder wall when extended.

3. Apparatus according to claim 2 in which a stem is mounted to said plate for connection to an actuator, a hermetic seal being formed around said stem.

* * * * *